Figure 8:
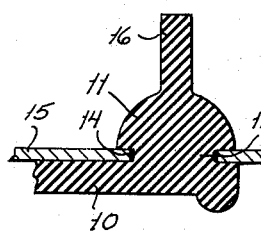

Jan. 20, 1942. G. F. CAVANAGH 2,270,266
GUARD FOR MOTOR VEHICLES
Filed March 21, 1940 3 Sheets-Sheet 1
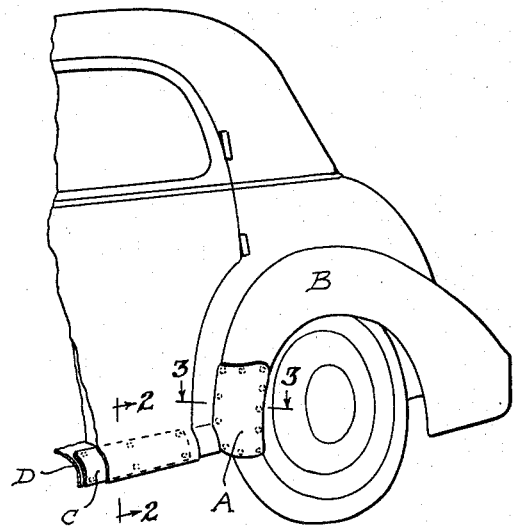
Fig. 1
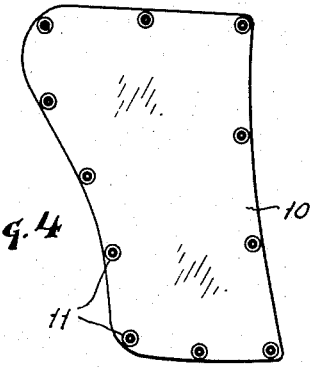
Fig. 4
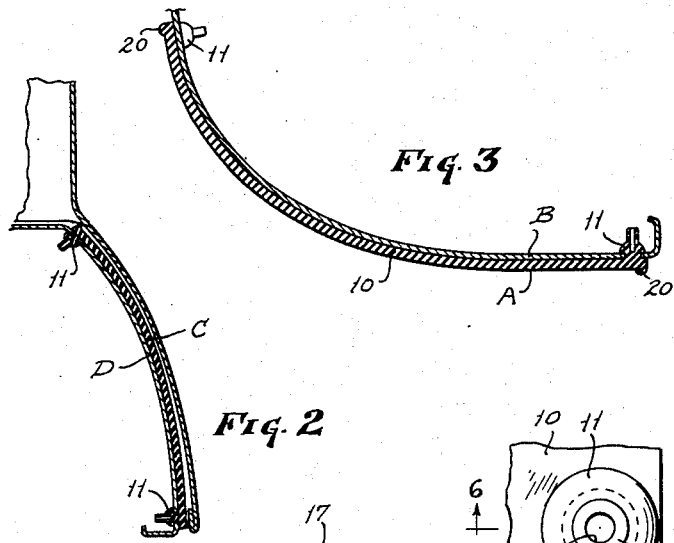
Fig. 3
Fig. 2
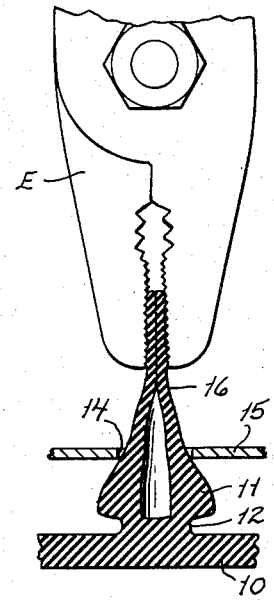
Fig. 7
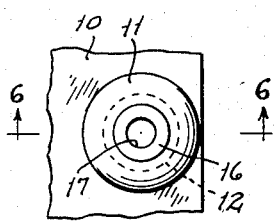
Fig. 5
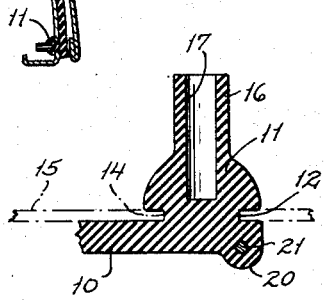
Fig. 6
INVENTOR.
GERALD F. CAVANAGH
BY
Bates, Teare, & McBean
ATTORNEYS Jan. 20, 1942.                G. F. CAVANAGH                2,270,266
                          GUARD FOR MOTOR VEHICLES
                          Filed March 21, 1940         3 Sheets-Sheet 2

INVENTOR.
GERALD F. CAVANAGH
BY Bates, Teare, & McBean
ATTORNEYS

Jan. 20, 1942.   G. F. CAVANAGH   2,270,266
GUARD FOR MOTOR VEHICLES
Filed March 21, 1940   3 Sheets-Sheet 3
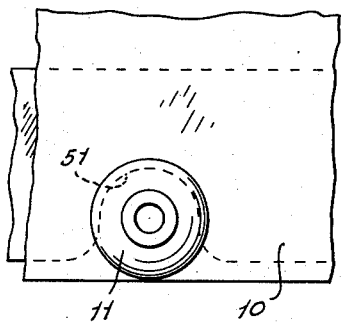
Fig. 20
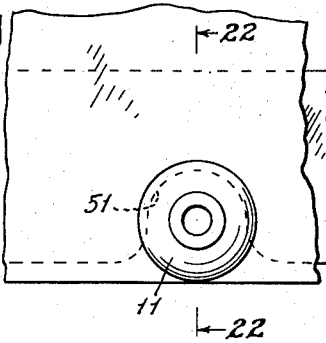
Fig. 21
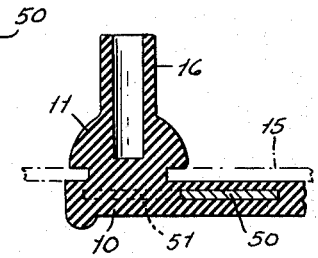
Fig. 22
Fig. 23
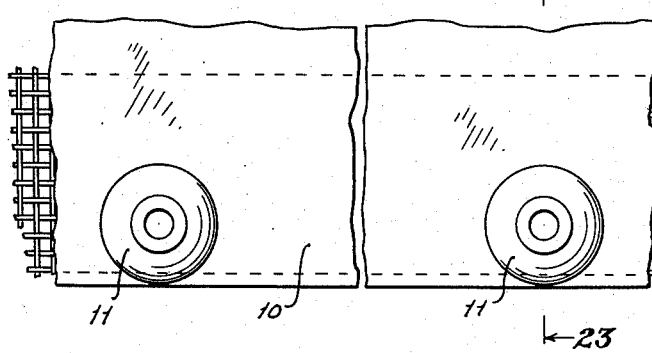
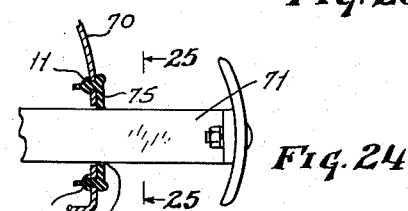
Fig. 24
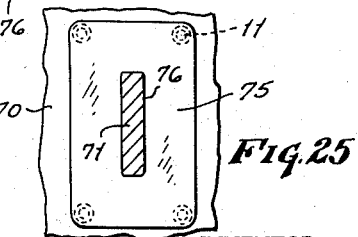
Fig. 25
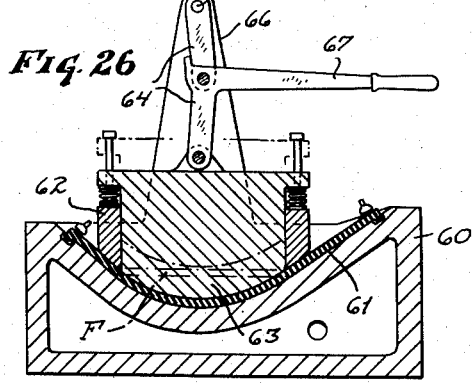
Fig. 26
INVENTOR.
GERALD F. CAVANAGH
BY Bates, Teare, & McBean
ATTORNEYS

Patented Jan. 20, 1942

2,270,266

UNITED STATES PATENT OFFICE 2,270,266

GUARD FOR MOTOR VEHICLES

Gerald F. Cavanagh, Euclid, Ohio

Application March 21, 1940, Serial No. 325,200

4 Claims. (Cl. 280—153)

This invention relates to a cover or surface guard especially adapted for use as a pebble or stone deflector for the outer forward surface of the rear fenders of an automobile, or as a cover for surfaces which are subjected to wear or surface abrasions. Pebble or stone deflectors are considered necessary on recent types of automobiles wherein running boards are omitted, and where as a result pebbles may be thrown against the rear fenders by the tires on the front wheels while the automobile is in motion.

In the past the guards, which were applied to automotive fenders, have comprised a rubber sheet which had been molded to a sheet metal plate and fastened to the fender with the metal plate in contact with the surface of the fender by means of bolts or metallic clips. The composite metal and rubber guard, made as aforesaid, is objectionable because it must be shaped to conform to the contour of the fender. The fenders of different automobile manufacturers vary in shape and size and accordingly as many shapes and sizes of guards must be developed to correspond to the various fenders to which they are to be applied. This obviously necessitates a large investment in tools and dies. The investment is augmented by virtue of the fact that not only the metallic plate of the guard has to be shaped to conform to the contour of the fender, but also the outer layer of rubber has to be molded substantially to the curvature of the fender and the guard plate, because due to the construction employed, a sheet of any other contour would pull away from the metal guard plate to which it was attached.

The difficulty of maintaining a tight contact between the metal and rubber members of the guard plate without preforming the rubber has been due to the absence of any satisfactory securing means for holding the rubber or the composite rubber and plate onto a fender or other article. An object of my invention is to make a cover, utilizable as a guard, which is suitable for accomplishing the purpose aforesaid and which can be applied directly to a fender without the need of an interposed metallic plate to which the rubber must be vulcanized or otherwise attached without requiring expensive tool equipment to mold the rubber to the contour of the fender. My invention contemplates a method of protecting the fender by means which eliminate necessity for bolts or kindred securing devices that are apt to work loose or be capable of improperly securing the protector to the fender with sufficient rigidity to prevent removal thereof by unauthorized persons.

A further object of the present invention is to seal the guard effectively to the fender or other article to which it is attached, especially along the marginal edges of the guard so as to prevent curling of the edges with resulting possibility of forming pockets into which water may enter and be held. The curling of the edges may result from the tendency of the rubber to shrink or curl after it is applied to an article while in stretched condition.

Another object of the present invention is to provide a protective guard or sheet which may be made substantially flat and will be provided with means for securing the sheet to the fender or article to which it is to be attached in such a manner as to retain the sheet in intimate contact with the surface of the article which is to be protected and over which the sheet may be stretched despite the curvature of the contour of such surface and which will also maintain such sheet in its stretched condition for prolonged periods of time.

Other objects and advantages of this invention will become more apparent from the following description, reference being had to the accompanying drawings in which I have illustrated preferred embodiments of the invention. The essential and novel features of the invention will be summarized in the claims.

Figure 10:
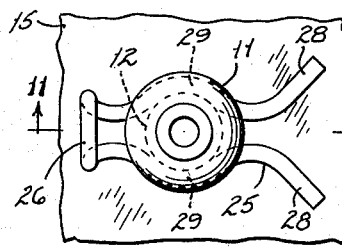
Figure 12:
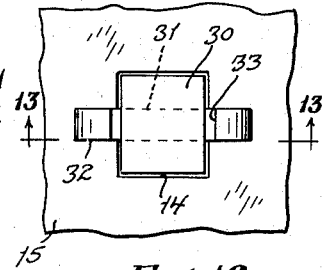
Figure 9:
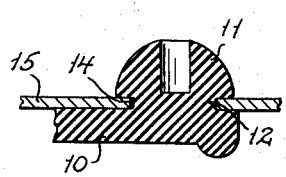
Figure 11:
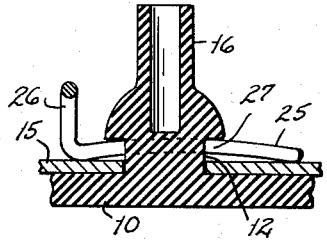
Figure 13:
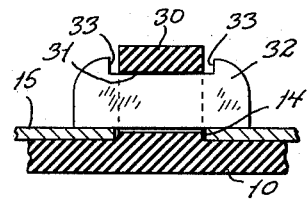
Figure 15:
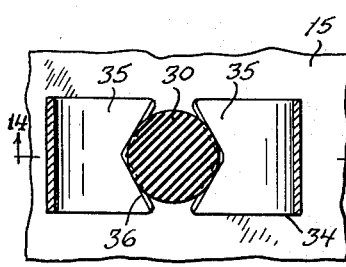
Figure 16:
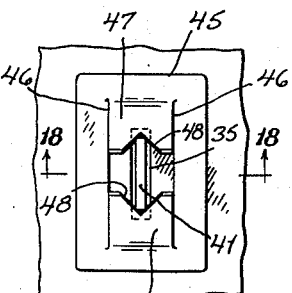
Figure 17:
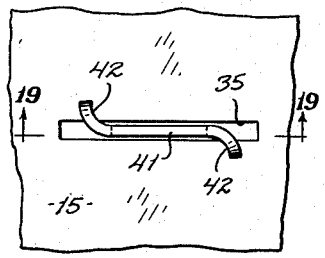
Figure 14:
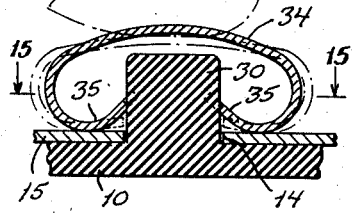
Figure 18:
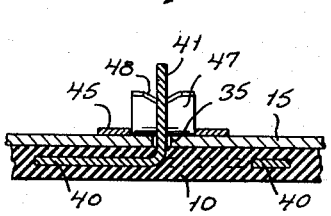
Figure 19:
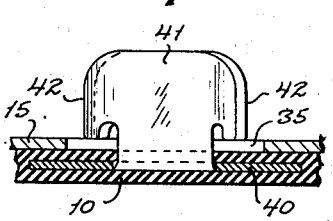

In the drawings, Fig. 1 is a fragmentary view of a motor vehicle illustrating examples of the application of my improved surface covers or stone deflectors; Figs. 2 and 3 are sectional views through the vehicle and my improved covers, the planes of the sections being indicated by the correspondingly numbered lines on Fig. 1; Fig. 4 is a rear or bottom view of my improved surface guard before assembly on the surface to be protected; Fig. 5 is a fragmentary bottom view of a cover illustrating one form of retaining means in plan view; Fig. 6 is a section, on an enlarged scale, through the retaining means of Fig. 5, the section being indicated by the line 6—6 on such figure; Fig. 7 is a sectional view similar to Fig. 6, illustrating a method of applying the cover to the surface to be protected; Figs. 8 and 9 are sectional views similar to Fig. 6, but illustrating modified forms of attaching means; Fig. 10 is a fragmentary bottom view, similar to Fig. 5, but illustrating a modified form of means for attaching the cover to the surface to be protected; Fig. 11 is a sectional detail, the plane of which is indicated by the lines 11—11 on Fig. 10; Fig. 12 is a fragmentary bottom view of another modified form of attaching means; Fig. 13 is a sectional view, the plane of the section being indicated by the line 13—13 on Fig. 12; Fig. 14 is a sectional view through another form of attaching means, the plane of the section being indicated by the lines 14—14 on Fig. 15; Fig. 15 is a section, the plane of which is indicated by the correspondingly numbered lines on Fig. 14; Figs. 16 and 17 are bottom plan views of further forms of attaching means; Figs. 18 and 19 are sectional views as indicated by the lines 18—18 and 19—19 on Figs. 16 and 17 respectively; Figs. 20 and 21 are fragmentary bottom plan views of modified forms of my improved guard or deflectors, while Figs. 22 and 23 are sectional views as indicated by the lines 22—22 and 23—23 of Figs. 20 and 21 respectively; Fig. 24 is a sectional view illustrating a different use for my improved guard; Fig. 25 is a section as indicated by the line 25—25 on Fig. 24; and Fig. 26 is a sectional view illustrating one step used in making certain types of my improved surface guard or stone deflector.

Referring again to the drawings, and especially to Fig. 1, I have illustrated two uses for my improved cover or surface protector in connection with an automotive vehicle. In this figure I have illustrated one cover or protecting device A for covering the outer, forward surface of the rear fender B of a motor vehicle, and a second cover or protecting device C for covering the splash board D or that portion of the body extending below the door opening. As shown, the cover A acts as a pebble or stone deflector for protecting the rear fender against visible marks, dents, etc., which might result from pebbles being thrown against the fender by the tire of the front wheel while the vehicle is in motion due to the absence of a running board formation. The device C protects the panel D from being scuffed or visibly marked by the feet of persons entering or alighting from the vehicle, as well as from marks or scratches which might result from contact of the door against such surface.

The protective covers are generally made of a rubber composition or a material having similar physical characteristics and when compared to a varnish or lacquer coating, such as is used on motor vehicles, the covers have considerable thickness. The composition material may be colored black or a color to match, or to slightly contrast with, the finish of the vehicle or article to which it is to be applied. In either instance, the cover is of the same color throughout its entire thickness. The composition selected is one of the many well-known rubber or similar compositions, which is tough and difficult to chip or scratch, and the surface of which will stand considerable rough treatment. Being of the same color throughout its entire thickness and not susceptible to rusting or discoloration, such a material maintains a pleasing appearance after much surface abuse, and, therefore, may be used to advantage on those areas of an article which are subjected to such wear or abuse, during the normal use of the vehicle, as would permanently mark or otherwise render a paint or lacquer coated surface unsightly. The resiliency of such rubber compositions absorbs the impact of pebbles, stones and the like, thus preventing the creation of permanent dents or blemishes.

My improved protecting devices or covers as shown in Figs. 2, 3 and 4, comprise comparatively thin rubber or rubber composition sheets, the under surface of which is provided with a plurality of projections or attaching devices for attaching the sheet directly to the surface to be protected, such as to the automotive vehicle fender B. Generally speaking, my improved cover is molded as a flat sheet from rubber or rubber composition which is sufficiently resilient and flexible as to readily take the shape of the surface to which it is applied. However, where said surface has extreme curvatures, the sheet may be stretched over the surface or may be slightly pre-formed to insure a close fit between the inner surface of the rubber sheet and the surface to which it is to be applied. As hereinafter will be described such a preforming as is herein contemplated does not require expensive or diversified molds or equipment.

A protecting sheet, or cover of the type with which this invention is concerned, should be held in intimate surface to surface contact with the surface to which it is to be applied by means which will facilitate replacement of the cover after a prolonged period of use and yet which will maintain surface contact at the edges of the cover throughout the life of the cover and which will also maintain the cover in position on deformed surfaces which require stretching of the sheet to cause it to conform to the surface contour of the article to which it is attached. To this end I may provide my improved cover 10, with a plurality of buttons 11. These buttons are preferably formed integrally with and of the same material as the cover, and extend outwardly from the bottom surface of the sheet at spaced intervals adjacent the periphery thereof. If the cover has considerable area, or the contour of the surface to which it is to be applied is, for instance, concave, the cover may be provided with buttons conveniently positioned relative to the surface contour to retain the cover in contact with the middle areas or concave portions of the surface to be covered.

The preferred form of retaining devices, above mentioned, comprises buttons 11. Each button comprises a spherical segment, the base of which is connected with the body 10 of the sheet or cover by a reduced neck portion 12. The size and shape of this neck is substantially the same as that of openings preformed in the surface of the article 15 to which the cover is to be applied, while the base of the button is somewhat larger than the size of such opening as is indicated in the drawings and particularly in Figs. 5 to 11. The height of the neck 12 or the distance from the surface of the sheet to the base of the button is substantially the same as the thickness of such article. In the case of automotive vehicles, the part to which the cover is to be attached is generally made of twenty gauge metal, the thickness of which is between thirty-four and thirty-eight thousandths of an inch.

To facilitate positioning of the buttons on the member 15, each button 11 may be provided with an elongated tip 16, of such a diameter and length as to pass freely through the opening 14 in the article and be grasped by the fingers or by a suitable tool or clamp, such as the pliers E, as shown in Fig. 7, to enable the entire button to be drawn through the opening 14.

I have found that a comparatively close fit between the periphery of the neck 12 and the wall of the opening 14 may be obtained by providing the tip and button with a hollow or cylindrical cavity 17. By so forming the button, a minimum of compressing and stretching is required to draw the button through the opening 14 and the button may be made larger in comparison with the size of such opening, as illustrated in the drawings. The hollow 17 extends axially through the tip and body of the button to the neck 12. However, the neck is left solid, so that when a button has been drawn through an opening 14, the latter is completely filled by the solid neck portion of the button. As shown in the drawings, the buttons are so positioned at spaced intervals on the cover so that the edge of the cover is substantially tangential with the button. This securely fastens the edges of the cover to the part to be protected. For strengthening purposes, the exposed outer surface of the cover may be provided with a rib or bead-like formation 20 around its periphery, such a formation aids materially in preventing fraying or curling of the edges of the cover and may, if desired, be reinforced by a flexible bead such as for instance, a fabric or metallic cord 21.

While I find it advantageous to provide the button 11 with a tip 16 as heretofore described, I find it convenient in some instances to eliminate such tip entirely, forming the button as shown in Fig. 9. In this instance the button is forced through the opening 14 by external pressure. Likewise, both the tip and button may be solid as shown in Fig. 8. Such constructions, however, limit the size of the button in respect to the size of the opening, therefore, the construction shown in Figs. 5 and 6 is preferable.

In some instances, especially where there is extreme danger of the device working loose or being removed from the surface protected by unauthorized persons, an additional locking device may be provided. One form of locking device is shown in Figs. 10 and 11 as comprising a wire clip 25. This clip comprises a looped wire preferably of spring metal, the looped end of which is bent substantially normal to the main body of the clip as shown at 26 in Fig. 10, while a slight bow is imparted to the legs as indicated at 27 in Fig. 11. The legs of the clip are flared outwardly at their ends as at 28, and are provided with arcuate portions 29 so that the clip may be readily forced into position around the neck 12 and snugly embrace the same.

When a locking device, such as the clip 25 is used, the neck of the button is preferably of a height equal to the sum of the thickness of the member through which the button passes and the thickness of the wire used in making the clip. The bowed portions 27 of the clip then maintain a slight tension on the button at all times, thus tending to both hold the clip in position on the button and to hold the cover tight against the surface to which it is applied. I have found that while this method of securing may be used around the entire perimeter of the cover, it is sometimes preferable to use it only in connection with certain of the buttons such as those adjacent corners or exposed edges.

A modified form of button and attaching locking means therefor is shown in Figs. 12 to 15. As there shown, the covers or sheets 10 are provided with an integrally formed buttons or plugs 30, which may pass freely through the openings 14 in the part to be protected. The button shown in Figs. 12 and 13 is provided with transverse slot 31 to receive a retainer such as a pin or locking bar 32. The slot is preferably somewhat smaller than the retainer so that the button will be placed under tension when the retainer is in position. This insures intimate contact between the under surface of the cover and the article, and between the retainer and the inner surface of the article. If desired, the ends of the retainer which project from the button may be enlarged providing retaining shoulders 33 to prevent inadvertent displacement of the retainer. The retainer may be made of wood, fibre, hard rubber or any substance desirable.

In the form illustrated in Figs. 14 and 15, the button 30 is solid and a spring clip 34 used to hold the button in place. Such clip may comprise, as shown, a strip of spring metal having its end portions curved downwardly and inwardly as shown at 35 (Fig. 14), and having its ends provided with V-shaped notches, as indicated at 36 in Fig. 15.

When using the form of fastening means shown in Figs. 14 and 15, the clip 34 is placed in position in substantial registration with an opening 14 in the part to be protected and pressure is applied to the clip as indicated in Fig. 14, to spread the ends of the clip apart, whereupon the button is forced through the opening 14 and between the ends of the clip. The release of the clip then causes the ends to engage and grip the button 30, and draw it upwardly (Fig. 14) tensioning and maintaining tension of both the clip and the button.

While the forms of attaching devices illustrated in Figs. 12 to 15 comprise a button 30 having a diameter substantially equal to the diameter of the opening through which it passes, it is obvious that the button may be made similar to that shown in Fig. 8.

Where the danger of unauthorized removal of the protective cover is great, I may make use of a metallic fastening device, such as is shown in Figs. 16 to 19. As there shown, a metallic insert 40 is molded in the rubber sheet. Preferably this insert comprises a relatively small disc or plate having a prong bent normal to the body and arranged to extend outwardly from the rear surface of the sheet. When this form of attaching device is used, the part to which the sheet is to be secured is provided with slotted openings 35 through which the prongs 41 may extend. The sides 42 of the prongs may then be bent out of alignment with the body as indicated in Fig. 17 to underlie the surface of the material to which the pad is secured, or a fastening device in the nature of a metallic spring clip 45 may be used to secure the prong in position. Such a spring clip is illustrated at 45 in Figs. 16 and 18 as comprising a relatively flat piece of spring metal having a pair of longitudinally extending slits 46. The metal between these slits is severed and bent outward from the body of the clip to provide two prongs or tongues 47, the inner edges of which are preferably formed or provided with a V-shaped notch 48 to engage or grip the corners of the side surfaces of a prong 41 to prevent its removal.

As heretofore mentioned, the cover may be reinforced about its periphery by inserting a cord in the bead 20. However, reinforcement of the cover adjacent its edges may be accomplished by molding a thin metallic strip 50 into the cover adjacent the edge as shown in Figs. 20 and 22. The strip 50 is preferably provided with cut-out portions 51 to underlie the buttons and permit maximum flexing of both the sheet and button at such areas and thereby facilitate the positioning of the cover on the surface to be protected and insure against separation of the body of the cover from the metallic strip. The strip 50 preferably is made of a comparatively soft metal so that it may be manually bent to conform to the contour of the surface to which the device is to be applied without necessitating any preforming operation or the use of forming tools.

In Figs. 21 and 23, I have shown the cover as being reinforced by a strip 55 of woven wire or fibrous fabric. This strip, as in the case of the metallic strip 50 above described, extends inward from the edge of the cover a distance slightly beyond the buttons. However, when wire fabric is used, the strip extends over the buttons themselves. This is possible when using wire fabric, as there is no tendency for the rubber strip to pull away from the fabric as in the case of a solid metal strip. Therefore, the use of wire fabric as a reinforcing means has the advantage that it may extend throughout the entire length of the cover without regards to the positioning of the buttons. This eliminates any possible distortion of the outer surface of the cover which lies over the buttons due to the tensioning action of the buttons or the locking means therefor. This is especially advantageous where the thickness of the part to which the cover is to be attached varies. Under such circumstances, it is desirable that the heights of the neck 12 be substantially the same as the minimum thickness of the part. Thus, thicker portions of the part to which the cover is attached might cause a stretching of the rubber and result in deforming the external surface of the cover. Obviously, the use of the wire fabric as a reinforcing means beneath the buttons prevents such distortion. As in the case of the metallic strip, it is preferable that the wire fabric be of a relatively soft metal so that it may be manually shaped to fit the part to which the device is to be applied by the person applying the cover without requiring either preforming or any specific special tools.

A highly deformed surface may be covered by molding and vulcanizing the cover substantially flat and thereafter stretching the flat sheet over a hot shape or mold and retaining the sheet in a stretched condition until a permanent set is given to the cover. I have found that when stretching is required, comparatively inexpensive stretching molds may be used and these need not be the exact shape of the article or surface to which the cover is to be applied, but need only be shaped so that the cover in some degree will conform to the general shape of the surface to which it is to be applied. In Fig. 26, I diagrammatically illustrate a mold for stretching the sheet. As there shown, the mold comprises a heated mold 60 having an open cavity 61 across which a cover is positioned and clamped in the position indicated by the dotted lines F by a spring pressed annulus 62 carried by a shoe 63. The shoe is connected by a pair of toggle links 64 to a shaft 65 mounted between a pair of brackets 66. One of the links 64 is provided with an operating handle 67. To stretch a cover, it is placed on the mold 60 as indicated by the dotted lines F and the handle 67 swung to bring the annulus 62 into clamping engagement with the cover. Thereafter continued movement of the handle 67 lowers the shoe, stretching the cover against the mold 60. The toggle link arrangement maintains the shoe in its stretching position, while heat applied to the mold sets the cover in its stretched position.

By eliminating the use of metallic plates as a base for the guard and applying the guard directly to the surface to be protected, I find that I have increased the uses to which the cover may be put. For instance, in Figs. 24 and 25, I have illustrated a somewhat different but similar use for my improved guard. In these figures, 70 indicates the metal trim of a motor vehicle at the region of a bumper support 71 which projects through a slotted opening in the trim, and 75 indicates my improved cover. As shown, the cover is provided with a slotted opening 76 somewhat smaller than the bumper supporting bar. The cover is slid onto the bar and against the metal trim and secured in place as above described in connection with Figs. 1 to 23 inclusive. When the cover is so used it not only closes the opening in the trim but dampens vibrations of the bumper supporting bar and prevents it from striking the metal trim.

From the foregoing description, it will be seen that I have provided a surface protecting device or cover especially adapted for use in protecting the external surfaces of automotive vehicles against scratches, abrasions and minor dents, which cover may be constructed at a minimum expense without the use of divers forming or molding dies and the like, and that I have so arranged the cover attaching means that the under surface of the rubber or composition with which the cover is formed will be intimately drawn into and maintained in contact with the surface to be protected. I have eliminated entirely the use of metal to metal contact between the coacting surfaces of the cover and article to which it is applied, by reason of which my improved protecting device serves not only to protect the surface to which it is applied, but also serves to dampen any sound or noise or vibration which might result from contact of metal to metal surfaces, and indeed to deaden the rumbling effect of the metallic surfaces to which it is applied. This is, of course, especially advantageous when the device is used in connection with automotive vehicles and the like.

While I have described my protective cover as being made of rubber or rubber composition, it is obvious that it may be made of many other materials having somewhat similar physical characteristics.

I claim:

1. A protective cover for surfaces, said cover comprising a sheet of flexible material, a plurality of buttons extending outwardly from one surface of said sheet, each of said buttons being connected to the sheet by a reduced neck portion adapted to snugly engage the walls of an opening through which the button may be pressed, said button being of a greater cross-sectional area than the area of the opening, and having a hollow therein, said hollow extending toward the sheet substantially to the plane of the neck, whereby the button may be readily reduced to force it through the opening in the article to which the cover is to be attached, said neck being solid to substantially completely fill said opening when the button has been positioned therethrough.

2. A protective, wear-resisting cover for surfaces, said cover comprising a flexible sheet of wear-resisting material, a plurality of buttons extending outwardly from one surface of said sheet, each of said buttons being connected to the sheet by a reduced neck portion adapted to snugly engage the walls of an opening through which the button may be pressed, said button being of a greater cross-sectional area than the area of the opening, and having a hollow therein, and a tubular stem on said button of such a diameter as to pass freely through said opening.

3. A protective wear-resisting cover for surfaces, said cover comprising a flexible sheet of wear-resisting material, a plurality of buttons extending outwardly from one surface of said sheet, each of said buttons comprising a spherical segmental portion, the base of which is connected to the sheet by a reduced neck portion adapted to occupy an opening through which the button may be passed, said button being of a greater cross-sectional area than the area of the opening, and an elongated stem on said button of such cross-sectional dimensions as to pass freely through said opening, and of such a length that it may be grasped to draw the button through the opening, said stem being on the side of the button opposite the neck.

4. A protective wear-resisting cover for surfaces, said cover comprising a flexible sheet of wear resisting material, a plurality of buttons extending outwardly from one surface of said sheet, each of said buttons comprising a spherical segmental portion, the base of which is connected to the sheet by a reduced neck portion, there being a substantially cylindrical stem projecting from the button, said stem having such a diameter as to pass freely through said opening, and of such a length that it may be grasped to draw the button through the opening, said stem being on the side of the button opposite the neck.

GERALD F. CAVANAGH.